United States Patent [19]

Van de Walle

[11] Patent Number: 5,264,017
[45] Date of Patent: Nov. 23, 1993

[54] INORGANIC REACTIVE GRANULATING BINDER AND CONDITIONER

[75] Inventor: Richard H. Van de Walle, Columbia, Md.

[73] Assignee: Martin Marietta Magnesia Specialties Inc., Baltimore, Md.

[21] Appl. No.: 799,743

[22] Filed: Nov. 23, 1991

Related U.S. Application Data

[63] Continuation of Ser. No. 481,685, Feb. 20, 1990, abandoned, which is a continuation of Ser. No. 141,227, Jan. 6, 1988, abandoned.

[51] Int. Cl.$^5$ .............................................. C05G 3/00
[52] U.S. Cl. ........................................... 71/61; 71/63; 71/64.03; 71/31; 106/38.3
[58] Field of Search ............................................ 426/74

[56] References Cited

U.S. PATENT DOCUMENTS

| Re. 31,804 | 1/1985 | Skoch et al. | 426/658 |
| 2,162,609 | 6/1939 | Dawe | 99/4 |
| 4,016,296 | 4/1977 | De Santis | 426/69 |
| 4,027,043 | 5/1977 | Schroeder et al. | 426/69 |
| 4,082,859 | 4/1978 | Katzen | 426/636 |
| 4,265,916 | 5/1981 | Skoch et al. | 426/74 |
| 4,431,675 | 2/1984 | Schroeder et al. | 426/69 |
| 4,775,539 | 10/1988 | Van de Wolle | 426/74 |

FOREIGN PATENT DOCUMENTS

| 3312098 | 10/1984 | Fed. Rep. of Germany . |
| 8201463 | 5/1982 | PCT Int'l Appl. . |
| 957963 | 5/1964 | United Kingdom . |
| 1073258 | 6/1967 | United Kingdom . |

OTHER PUBLICATIONS

CA 102(5):45109h Artificial Langbienite), Neitzel et al., 1984.

*Primary Examiner*—Ferris Lander
*Attorney, Agent, or Firm*—Gay Chin; Bruce M. Winchell; Herbert W. Mylius

[57] ABSTRACT

A binder for fertilizer granulation is taught, comprising a reactive mixture of a metal salt and a metal oxide or hydroxide. Use of this binder permits the incorporation of higher percentages of "fines" or small particle fertilizer components.

12 Claims, No Drawings

INORGANIC REACTIVE GRANULATING BINDER AND CONDITIONER

This application is a continuation, of application Ser. No. 481,685, filed Feb. 20, 1990 and now abandoned, which is a continuation, of application Ser. No. 07/141,227, filed Jan. 6, 1988 and now abandoned.

BACKGROUND OF THE INVENTION

This invention relates generally to the agglomeration, pelletizing, or granulation of various plant food nutrients, either as complete fertilizer products suitable for direct field application, or as granular concentrates which can be physically blended with other materials to form complete fertilizer formulations. More specifically, this invention relates to use of a novel binder/conditioner to assist in the agglomeration, granulation or pelletizing of various fertilizer components.

Most fertilizer granulation plants still operating in the United States are of the continuous ammoniation-granulation type. In such a plant superphosphate, potassium chloride, potassium sulfate, ammonium sulfate, urea and other dry nutrient containing materials are measured continuously by gravimetric belt feeders. Liquid raw materials such as anhydrous ammonia, nitrogen solutions, sulfuric acid and phosphoric acid are measured continuously by metering. Both liquid and dry materials are fed into a rotating drum or granulator, where products are intimately mixed and agglomeration takes place. After the initial granulation phase, the product passes through a rotary dryer and rotary cooler. The cooled product is screened to separate the on-size product from oversize and fines. Oversize material is crushed and rescreened, and fines are recycled back to the ammoniator-granulator. The Tennessee Valley Authority (TVA) and the United States Department of Agriculture have contributed a wealth of additional information to the granulation process over the past three decades. Circular Z-18, published in November 1970 by the TVA and The National Fertilizer Development Center, entitled "Producing Granular Fertilizers," describes in detail typical granulation techniques of fertilizers.

Raw materials used in the granulation process usually vary in size from as small as, for example, minus 325 mesh to as large as the minimum size specification of the finished product. Great care must be exercised in determining the proportions of various sized raw materials to be included in granulating product, so as to produce a final mix which granulates at an efficient rate. Maximum level of on-size finished product, particularly when no binder is used, is produced when a variety of sizes of raw material is included in the raw material feed. This, however, tends to significantly increase the cost of final product. At the same time, nitrogen, phosphate, potassium and secondary and micronutrient levels must be maintained at the required specification in order to meet the desired formulation.

Many raw material products available to the fertilizer granulator are more economically priced if the granulator can use reduced size or "fines" of the raw material in question. Raw materials such as potassium chloride, potassium nitrate, ammonium sulfate, ammonium phosphate, urea, potassium sulfate, and others, are frequently available to the fertilizer granulator in a reduced sizing and at a reduced cost. Maximum economy in such cases depends on maximum use levels. In addition, there is often raw material available which is considered "distressed goods," as it is no longer in condition to be used for bulk blended product.

If a proper balance of fertilizer chemistry and raw material size balance is not met, the granules which are formed during granulation are often weak and readily disintegrate to powder during handling and use. Dustiness in the product can become excessive, causing extreme handling and flow problems during transfer and in fertilizer application equipment.

Certain other raw materials and raw material combinations, when used at the most economically desirable levels, draw excessive moisture to the finished granule, thus limiting its storage and shelf life and causing excessive caking in storage bins, finished product piles and fertilizer application equipment. One class of such ingredient which frequently exhibits this characteristic is urea and urea combinations. A granular urea containing composition encompassing calcium sulfate and calcium phosphate is shown in U.S. Pat. No. 4,283,423, of Watkins et al. Various possibilities have been proposed to avoid such caking when utilizing urea in fertilizer manufacture. They include "dusting" a conditioning agent on the manufactured granule. Such dusting agents include starch, clays and calcium sources, as described in U.S. Pat. No. 3,332,827. This method, however, is less than satisfactory as it requires additional equipment and at best only coats portions of the granule thus providing only partial relief from caking.

SUMMARY OF THE INVENTION

It is therefore the object and advantage of this invention to provide a binding medium for granulated fertilizer manufacture and other industrial granulating requirements, which increases the level of raw material fines which can be used in a particular fertilizer formulation. As an example, it would be advantageous to increase the amount of fine particle ammonium sulfate or potassium chloride to achieve a nutrient formulation requirement, as opposed to using a higher level of more costly coarse grade product.

Another object of the invention is to provide a binder/conditioning agent which promotes a free flowing granular fertilizer which would normally contain the primary nutrients of nitrogen, phosphate and potassium plus secondary and micronutrients which may be required for a particular plant food application.

Another object of the invention is to provide a product with binding ability which is useful in agglomerating high analysis raw material fines such as ammonium sulfate and potassium chloride into a granular consistency for ultimate use in fertilizer bulk blending applications.

Another object of the invention is to provide a binding medium which increases the rate of agglomeration and a higher level of on-size product.

DESCRIPTION OF PREFERRED EMBODIMENTS

The novel combination binder and conditioning agent for use in fertilizer and other commercial pelleting agglomerating or granulating applications consists of a reactive metal salt component, and a reactive metal oxide or hydroxide. Alternatively, a reactive acid or combination of acids such as sulfuric acid, hydrochloric acid, or others, may be reacted with a reactive metal oxide or hydroxide such that the oxide or hydroxide or combination thereof is in excess of the stoichiometric neutralization value, thus forming the same type of reactive binder combinations as the reactive salt and oxide or hydroxide combinations.

The reactive salt may be selected from calcium chloride, magnesium chloride, aluminum chloride, magnesium sulfate, potassium sulfate, magnesium potassium sulfate, calcium sulfate, aluminum sulfate or mixtures of the above which would be suitable additions to the process involved. Magnesium chloride, magnesium sulfate, potassium sulfate and magnesium potassium sulfate are particularly suitable as the reactive metal salt component of the instant invention as they have a high degree of chemical reactivity with the other component of the binder/conditioner.

An important factor in choosing the reactive metal salt is particle size. Appropriate particle size can range from not greater than minus 16 mesh U.S. sieve scale to minus 325 mesh U.S. sieve scale or smaller. The most desirable sizing is from minus 60 mesh U.S. sieve scale to minus 325 U.S. sieve scale or smaller.

The reactive metal salt source which is utilized in the instant invention may be used in a concentration from about 0.10 to about 6 percent by weight of the total fertilizer formulation, expressed as the metal salt. The most preferred level is from about 0.15 percent to about 2.0 percent by weight, expressed as the metal salt.

The reactive metal oxide may be magnesium oxide, calcium oxide, aluminum oxide or calcium magnesium oxide (dol?me). Reactive metal hydroxides suitable for this purpose can be selected from magnesium hydroxide, aluminum hydroxide, magnesium calcium hydroxide or calcium hydroxide. Combinations of the above or other reactive oxides or hydroxides which would be suitable in the agglomerating process involved may also be utilized.

Of the reactive metal oxides and hydroxides suitable for this invention, magnesium oxide, calcium oxide and calcium magnesium oxide are most suitable as they have a high degree of chemical reactivity with the other component of the binder/conditioner when utilized with proper specifications of surface area and sizing.

The reactive metal oxide or hydroxide should be in a size range of from about 16 mesh U.S. sieve scale to about 325 mesh U.S. sieve scale or smaller. The most desirable sizing is from 100 mesh U.S. sieve scale to 325 mesh U.S. sieve scale or smaller.

Typically the amount of reactive metal oxide or hydroxide which is utilized in the instant invention is from about 0.2 percent to about 12.0 percent by weight of the total fertilizer formulation. The most preferred levels of use are from 0.30 percent to 4 percent by weight of the total feed formulation, expressed as the oxide.

High purity magnesium oxide, suitable for use in this invention, is typically the product of reacting magnesium chloride solution, for example as contained in seawater or magnesium chloride brine, with lime (CaO), or dolomitic lime (MgO/CaO), to precipitate insoluble magnesium hydroxide, which is calcined to between about 650° C. and about 1150° C., usually in a multiple hearth or rotary kiln. This results in a magnesium oxide product with a B.E.T. surface area of between 10 square meters per gram and 120 square meters per gram. Alternatively, magnesium oxide with approximately the same surface area specifications can be produced commercially by calcining natural magnesite ($MgCO_3$).

Calcium oxide is the product of calcination of calcitic limestone ($CACO_3$). Calcitic limestone can be calcined by various methods including a shaft kiln, in an indirect gas-fired kiln, in a mixed feed kiln, in a parallel flow regeneration kiln, or in a rotary kiln, usually at about 870° C. to about 1150° C. The calcium oxide useful for this invention would preferably exhibit a B.E.T. surface area from about one square meter per gram to about 2 square meters per gram.

Calcium magnesium oxide (dolime) is the product of calcination of dolomitic limestone ($CaCO_3/MgCO_3$). Dolomitic limestone can be calcined by any of the methods listed for calcitic limestone, above. Regardless of the method of calcination, this invention preferably utilizes high purity dolime which has been calcined in the temperature range of from about 1090° C. to about 16500° C. Calcined high purity dolime would range in analysis from approximately 40 to 42 percent MgO and 56 to 58 percent CaO. Typical surface area for the purpose of this invention would range from 2 square meters per gram to approximately 6 square meters per gram, as measured by the B.E.T. surface area method.

The two components of the instant fertilizer binder/conditioner system, namely the reactive metal oxide or hydroxide and the reactive salt, are admixed to obtain a uniform blend of materials. The ratio of metal oxide or hydroxide, expressed as the metal oxide to the reactive salt can range from about 4:1 to about 1:4; however, the most preferred ratio for this admixed combination is from about 1:3 to about 3:1 metal oxide or hydroxide to reactive salt. The blended admixture of metal oxide or hydroxide and reactive salt is then added to the total fertilizer formulation prior to granulating. Alternatively, the desired ratio of metal oxide or hydroxide to reactive salt can be admixed separately into the complete fertilizer formulation which is to be granulated.

In the practical application of this novel binder/conditioning agent, from about 0.30 percent to about 18 percent of the binder/conditioner is blended with the other fertilizer ingredients typically utilized in the fertilizer industry. Actual use levels, however, are highly dependent on the level of fines which are present in the formulation, plus the total amount of liquid phase which is also present in the formula. After physical blending, in which the novel binding agent of this invention is intimately mixed with the other dry ingredients of the fertilizer, the dry mix or "base" is fed into the granulator or pelletizer. Water and other liquid ingredients are then mixed with the dry base. The components of the binder/conditioner are activated during this phase, displaying improved granulation yield with a higher level of on-size wet granules compared to the same formulation without the novel binder/conditioner additive.

After granules have been formed in the pelletizing or granulating phase, they are next fed to a dryer. The typical dryer system is a rotary type in which product is fed continuously into one end of a rotary drum with heat supplied at the end into which the product is fed. Heated air is forced through the drum as it rotates and granules are dryed at from about 100° F. to about 220° F. Other drying systems adequate for this purpose could also be used. An additional unique aspect of this novel invention, which is apparent at this point in the manufacturing process, is the effect that the binder/conditioner has on the energy used to dry the product. A significant reduction in total drying requirement as measured by exit temperature is often noted. The entire mechanism of this energy requirement reduction is not completely understood, but it is speculated that some of the free moisture which was introduced into the granulation phase is converted to water of hydration through the action of the binder/conditioner, and thus reduces the total drying demand of the dryer system.

It has also been recognized that when this unique binder/conditioner is used in various typical fertilizer formulations, higher levels of liquid ingredients, such as phosphoric acid and sulfuric acid, can be utilized, reactions of which with other fertilizer ingredients (for example ammonia) increase the chemical heat generated. This results in a product which is hotter during the granulation phase and thus enters the dryer at a higher beneficial temperature. From the dryer, product is usually cooled by means of a rotary cooler, vertical counter-flow cooler, or some other appropriate cooler system.

There appears to be no upper limit to the level of fines which can be used in a fertilizer formulation using this novel binder/conditioner, as long as adequate liquid phase is maintained to both assist initial agglomeration and activate the novel binder/conditioner of this invention. In general, however, and for practical formulation, it is recognized that increases in the use of fines of typical raw materials such as ammonium sulfate and potassium chloride are in the range of 25% to 50% by weight.

EXAMPLE I

Under plant conditions the following 13—13—13 fertilizer formulations were prepared and agglomerated using a TVA type ammoniator-granulator. Formulation IA utilizes a binder additive as described herein, consisting of a combination of calcined dolomitic limestone (dolime) and magnesium potassium sulfate at 20 pounds per ton of fertilizer, premixed in a ratio of two parts dolime to one part magnesium potassium sulfate. Formulation IB represents the same fertilizer composition, absent the novel binder additive.

| Formulation IA (13-13-13) | |
|---|---|
| Standard (fine) ammonium sulfate | 34.1% |
| Ammonia | 4.1% |
| Urea | 0.6% |
| Zinc oxide | 3.6% |
| Binder/conditioner of this invention | 1.0% |
| Phosphoric acid | 11.6% |
| Coloring | 0.05% |
| Sulfuric acid | 6.3% |
| Manganese oxide | 3.2% |
| Standard (fine) potassium chloride | 21.0% |
| Diammonium phosphate | 14.6% |

| Formulation IB (13-13-13) | |
|---|---|
| Standard (fine) ammonium sulfate | 17.1% |
| Coarse ammonium sulfate | 17.0% |
| Ammonia | 4.1% |
| Urea | 0.6% |
| Zinc oxide | 3.6% |
| Phosphoric acid | 11.6% |
| Coloring | 0.05% |
| Sulfuric acid | 6.3% |
| Manganese oxide | 3.2% |
| Standard (fine) potassium chloride | 10.5% |
| Coarse potassium chloride | 10.5% |
| Diammonium phosphate | 14.6% |
| Filler | 1.0% |

Formulation IB represents the maximum practical use levels, for the equipment used, of both standard grade (fine) ammonium sulfate and standard grade (fine) potassium chloride which can be used and at the same time produce the desired production rate when no binder is used.

In Formulation IA, no difficulty was encountered in achieving the same production levels as Formulation IB, while at the same time doubling both the percent of standard (fine) ammonium sulfate used and the percent of standard (fine) potassium chloride used.

EXAMPLE II

Under plant conditions the following 10-2-10 fertilizer formulations were prepared and agglomerated using a TVA type ammoniator-granulator.

Formulation IIA utilizes a binder additive as described herein consisting of a combination of calcined dolomitic limestone (dolime) and magnesium potassium sulfate at 10 pounds per ton of the finished fertilizer, premixed at a ratio of two parts dolime to one part magnesium potassium sulfate.

| Formulation IIA | |
|---|---|
| Standard (fine) ammonium sulfate | 21.4% |
| Ammonia | 3.4% |
| Zinc oxide | 3.5% |
| Monoammonium phosphate | 25.5% |
| Binder/conditioner of this invention | 0.5% |
| Phosphoric acid | 12.1% |
| Standard potassium chloride | 16.1% |
| Coloring | 0.05% |
| Sulfuric acid | 5.8% |
| Filler | 8.5% |
| Manganese oxide | 3.2% |

| Formulation IIB | |
|---|---|
| Standard (fine) ammonium sulfate | 10.7% |
| Coarse ammonium sulfate | 10.7% |
| Ammonia | 3.4% |
| Zinc oxide | 3.5% |
| Monoammonium phosphate | 25.5% |
| Phosphoric acid | 12.1% |
| Standard (fine) potassium chloride | 8.0% |
| Coarse (granular) potassium chloride | 8.1% |
| Coloring | 0.05% |
| Sulfuric acid | 5.8% |
| Filler | 9.0% |
| Manganese oxide | 3.2% |

Formulation IIA, in which the unique binder/conditioner of this invention was used, produced a final granular product of comparable quality and at a manufacturing rate comparable to Formulation IIB even though the source of ammonium sulfate and potassium chloride was completely from raw material fines. Previous manufacturing experience with this grade of fertilizer has taught that practical use levels without the unique binder additive is represented by Formulation IIA.

EXAMPLE III

Under plant conditions using a TVA type granulator system, standard (fine grade) ammonium sulfate was granulated successfully to an appropriate sizing for use in bulk blended fertilizer applications. For such sizing substantially all product should pass a 6 mesh U.S. screen sizing and substantially all product should be retained on 16 mesh U.S. screen sizing.

The following formula utilized the unique binder/conditioner of this invention to produce a production rate of approximately 10 tons per hour of on size granulated product.

| Formulation III | |
|---|---|
| Ammonium sulfate fines | 83.8% |
| Urea | 6.6% |
| Sulfuric acid | 4.9% |
| Binder/conditioner of this invention | 3.7% |
| Water | 1.0% |

Since a small amount of nitrogen is lost in processing ammonium sulfate to a granular sized product, additional urea was added to maintain a theoretical analysis of 20.8-0-0-22.1 S. Sulfuric acid is also used to limit the amount of nitrogen loss by volatilization.

The product was a hard, durable granule of strength sufficient to be processed as a dry bulk blend additive to bulk blended fertilizers with an average crush strength of 7-10 pounds.

EXAMPLE IV

Under plant conditions, the following 20-10-10 fertilizer formulation was prepared and agglomerated using a TVA type ammoniation-granulator.

This formulation utilizes the binder/conditioner additive described, which consisted of a combination of calcined dolomite limestone (dolime) and magnesium potassium sulfate at 10 pounds per ton of the finished fertilizer, premixed at a ratio of 2 parts dolime to 1 part magnesium potassium sulfate.

| Formulation IV (20-10-10) | |
|---|---|
| Standard (fine) ammonium sulfate | 14.9% |
| Ammonia | 3.4% |
| Urea | 26.4% |
| Diammonium phosphate | 14.5% |
| Phosphoric acid | 3.4% |
| Coarse potash | 15.6% |
| Color | .05% |
| Sulfuric acid | 8.4% |
| Binder conditioner of this invention | 0.5% |
| Filler | 6.2% |
| Magnesium oxide | 1.8% |
| 11-26-8 filler grade | 4.8% |

Previously, when no binder additive of this invention was used, manufacture of this grade with the high urea content produced a product with poor storage characteristics and excessive caking in storage. When the binder additive of this invention disclosure was used at 10 pounds per ton of fertilizer, as in the above formulation, product condition remained hard and flowable even under humid storage conditions.

It is to be understood that the above description of the present invention is susceptible to various modifications, changes, and adaptations by those skilled in the art, and that the same are to be considered to be within the scope of the present invention, which is set forth by the appended claims.

I claim:

1. A granular plant fertilizer produced by the process comprising the steps of:
   (a) mixing one or more reactive metal oxides selected from the group consisting of magnesium oxide, calcium oxide, aluminum oxide and calcium magnesium oxide, and one or more reactive metal salts selected from the group consisting of calcium chloride, magnesium chloride, aluminum chloride, magnesium sulfate, potassium sulfate, potassium magnesium sulfate, calcium sulfate and aluminum sulfate to form an admixture having a reactive metal oxide to reactive metal salt ratio of from about 4:1 to about 1:4;
   (b) combining the admixture with dry plant fertilizer ingredients; and
   (c) granulating the dry plant fertilizer ingredients and admixture by contacting the dry plant fertilizer ingredients and admixture with water in a granulator to initiate a reaction between the reactive metal oxide and reactive metal salt to thereby form a binder for the dry plant fertilizer ingredients, the binder consisting essentially of the reaction product of the reactive metal oxide and reactive metal salt.

2. A binder as set forth in claim 1, wherein said reactive salt is selected from the group consisting of magnesium chloride, magnesium sulfate, potassium sulfate, and magnesium potassium sulfate.

3. A binder as set forth in claim 1, wherein the reactive metal s about minus 16 mesh to about minus 325 mesh in size.

4. A binder as set forth in claim 1, wherein the reactive oxide is from about minus 16 mesh to about minus 325 mesh in size.

5. A binder as set forth in claim 1, wherein said reactive metal oxide is magnesium oxide having a surface area of from about 10 square meters per gram to about 120 square meters per gram.

6. A binder as set forth in claim 1, wherein said reactive metal oxide is calcium oxide having a surface area of from about 1 square meter per gram to about 2 square meters per gram.

7. A binder as set forth in claim 1, wherein said reactive metal calcium magnesium oxide having a surface area of from about 2 square meters per gram to about 6 square meters per gram.

8. A granular plant fertilizer produced by the process comprising the steps of:
   (a) mixing one or more reactive metal oxides selected form the group consisting of magnesium hydroxide, aluminum hydroxide, magnesium calcium hydroxide and calcium hydroxide, and one or more reactive metal salts selected from the group consisting of calcium chloride, magnesium chloride, aluminum chloride, magnesium sulfate, potassium sulfate, potassium magnesium sulfate, calcium sulfate and aluminum sulfate to form an admixture having a reactive metal hydroxide to reactive metal salt ratio of from about 4:1 to about 1:4;
   (b) combining the admixture with dry plant fertilizer ingredients; and
   (c) granulating the dry plant fertilizer ingredients and admixture by contacting the dry plant fertilizer ingredients and admixture with water in a granulator to initiate a reaction between the reactive metal hydroxide and reactive metal salt to thereby form a binder for the dry plant fertilizer ingredients, the binder consisting essentially of the reaction product of the reactive metal hydroxide and reactive salt.

9. A binder as set forth in claim 8, wherein said reactive salt is selected from the group consisting of magnesium chloride, magnesium sulfate, potassium sulfate, and magnesium potassium sulfate.

10. A binder as set forth in claim 8, wherein the reactive metal salt is from about minus 16 mesh to about minus 325 mesh in size.

11. A binder as set forth in claim 8, wherein the the reactive hydroxide is from about minus 16 mesh to about minus 325 mesh in size.

12. A granular plant fertilizer produced by the process comprising the steps of:
(a) mixing acid selected form the group consisting of sulfuric acid, hydrochloric acid and mixtures thereof and reactive metal oxide, hydroxide or mixture thereof selected from the group consisting of magnesium oxide, calcium oxide, magnesium calcium oxide, aluminum oxide, magnesium hydroxide, calcium hydroxide, magnesium calcium hydroxide and aluminum hydroxide, with dry plant fertilizer ingredients in a granulator, the amount of the oxide, hydroxide or mixture thereof being in excess of the stoichiometric neutralization value of the acid; and
(b) granulating the ingredients by initiating a reaction between the acid and reactive metal oxide, hydroxide or mixture thereof to thereby form a binder for the dry plant fertilizer ingredients, the binder consisting essentially of the reaction product of the acid and reactive metal oxide, hydroxide or mixture thereof.

* * * * *

UNITED STATES PATENT AND TRADEMARK OFFICE
CERTIFICATE OF CORRECTION

PATENT NO. : 5,264,017
DATED : November 23, 1993
INVENTOR(S) : Richard H. Van de Walle It is certified that error appears in the above-identified patent and that said Letters Patent is hereby corrected as shown below:

Column 3, line 29, change "dol?me" to --(DOLIME)--

Column 3, line 67, change "CACO$_3$" to --CaCO$_3$--.

Column 4, line 14, change "16500°" to --1650°--.

Column 6, line 11, change "10-2-10" to --10-20-10--.

Column 8, claim 3, line 22, delete "s" and insert therefor --salt is from--.

Column 8, claim 7, line 37, after "metal" insert --oxide is--.

Column 8, claim 8, line 43, change "oxides" to --hydroxides--; and line 5, change "form" to --from--.

Column 9, claim 11, line 4, delete "the" (second occurrence).

UNITED STATES PATENT AND TRADEMARK OFFICE
CERTIFICATE OF CORRECTION

PATENT NO. : 5,264,017
DATED : November 23, 1993
INVENTOR(S) : Richard H. Van de Walle It is certified that error appears in the above-indentified patent and that said Letters Patent is hereby corrected as shown below:

Column 4, line 7, "(dolime)" should read --(DOLIME)--
Column 7, line 27, "(dolime)" should read --(DOLIME)--.

Signed and Sealed this

Sixth Day of September, 1994

Attest:

BRUCE LEHMAN

*Attesting Officer*   *Commissioner of Patents and Trademarks*